J. A. REISCHMANN, Jr.
DIRECTION INDICATOR.
APPLICATION FILED JULY 15, 1915. RENEWED JULY 24, 1919.
1,331,674.  Patented Feb. 24, 1920.
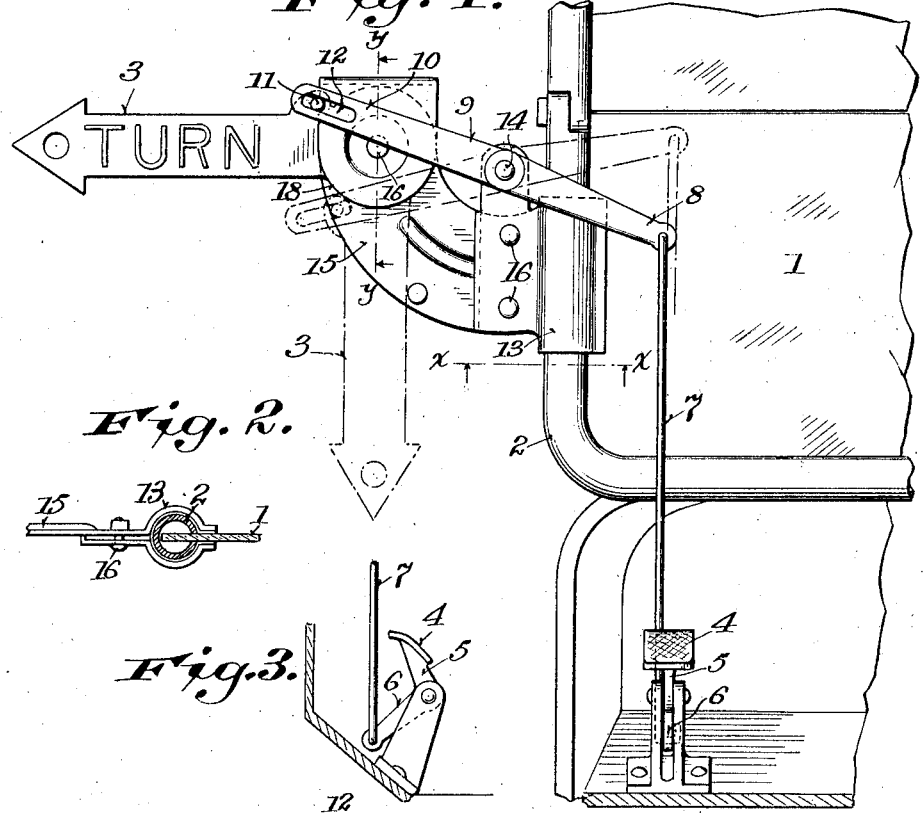
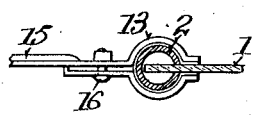
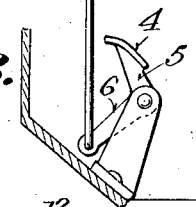
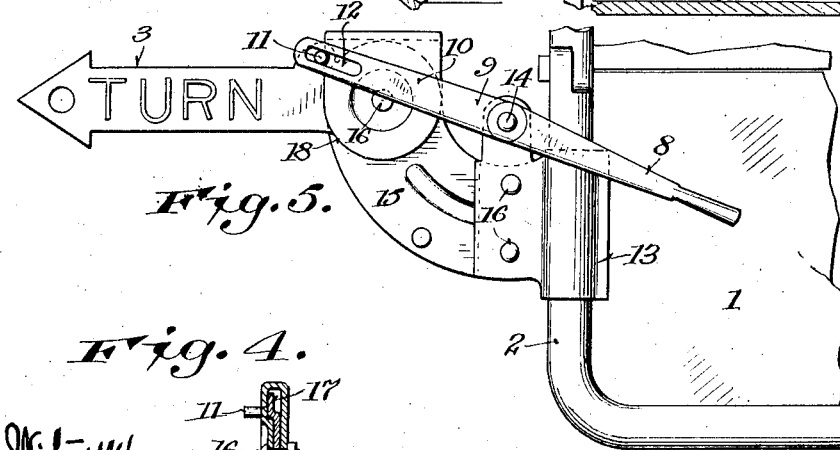

UNITED STATES PATENT OFFICE.

JOSEPH A. REISCHMANN, JR., OF MILWAUKEE, WISCONSIN.

DIRECTION-INDICATOR.

1,331,674.  Specification of Letters Patent.  Patented Feb. 24, 1920.

Application filed July 15, 1915, Serial No. 39,939. Renewed July 24, 1919. Serial No. 312,984.

*To all whom it may concern:*

Be it known that I, JOSEPH A. REISCHMANN, Jr., a citizen of the United States, residing at the city of Milwaukee, county of Milwaukee, and State of Wisconsin, have invented new and useful Improvements in Direction-Indicators, of which the following is a specification.

My invention relates to improvements in devices for indicating the direction of moving vehicles, and it pertains more especially to that class which are used in connection with automobiles and the like to indicate when such vehicle is about to turn out of its direct forward course, and also the direction it is intended to take.

It is well known that owing to the fact that automobiles are frequently driven at a high speed it becomes necessary to use more than usual diligence to prevent collisions between such vehicles. I have therefore provided means which are adapted to be operated either by hand or foot, whereby a pointer may be easily and quickly thrown out at right angles to such vehicle, whereby the operator or driver of an approaching vehicle may readily see and know the direction which it is proposed to turn, whereby a collision with such moving vehicles which might otherwise occur is avoided.

My invention is further explained by reference to the accompanying drawings in which—

Figure 1 represents a front view of my device attached to one side of the wind shield of an ordinary automobile.

Fig. 2 is a transverse section, drawn on line *x, x* of Fig. 1, of the mechanism for connecting the pointer with the wind shield.

Fig. 3 is a side view, part in section of the foot operated device shown in Fig. 1.

Fig. 4 is a vertical section of the device, drawn on line *y, y* of Fig. 1, for supporting the pointer, and Fig. 5 is a front view of the device shown in Fig. 1, as the same is made when operated by hand.

Like parts are identified by the same reference numeral throughout the several views.

1 is a wind shield of ordinary construction, 2 is a shield supporting frame. 3 is a pointer which is used to indicate the direction which it is proposed to turn the vehicle. When the pointer is not in use the same is dropped to the position indicated by dotted lines in Fig. 1, when it will be understood that the vehicle is to move forward in a direct line. When, however, it is desirous to turn the vehicle the operator moves the arm 8 of the lever 9 downwardly, whereby the opposite arm 10 of said lever is raised thereby moving the pointer 3 from the position shown in dotted lines in said Fig. 1 to that shown in full lines in said figure, motion being communicated from said arm 10 to the pointer 3 through the pivotal bolt 11, operating in the slot 12 of said arm 10. The lever comprising the arms 8 and 10 is pivotally supported from the frame 2 of the wind shield by the clamping member 13, pivotal bolt 14, bracket 15, and said bracket and clamping member are preferably connected together by a plurality of bolts or rivets 16. The pointer 3 is preferably provided with a supporting disk 17 which is adapted to operate between the members 18 and 19 of said bracket, as shown in Fig. 4, whereby said pointer is securely retained in place in connection with said bracket 15. The pointer 3 is preferably provided with the word "Turn" or other characters to indicate its function.

Having thus described my invention what I claim as new and desire to secure by Letters Patent, is:

The combination of a pointer, means for pivotally connecting said pointer to an automobile shield, a two armed lever, said lever being provided at one end with an elongated slot and at its opposite end with a handle adapted to be manually operated, a pin projecting laterally from the side of said pointer through said slot, whereby an operator may by a downward movement of one arm of said lever move said pointer to a position at right angles to said shield.

In testimony whereof I affix my signature in the presence of two witnesses.

JOSEPH A. REISCHMANN, JR.

Witnesses:
 JAS. B. ERWIN,
 IRMA D. BREMER.